US011301910B2

(12) United States Patent
Robinson et al.

(10) Patent No.: US 11,301,910 B2
(45) Date of Patent: Apr. 12, 2022

(54) SYSTEM AND METHOD FOR VALIDATING VIDEO REVIEWS

(71) Applicant: Melini LLC, Atlanta, GA (US)

(72) Inventors: Jamel Robinson, Locust Grove, GA (US); Michael Paul Peloquin, Colwich, KS (US)

(73) Assignee: Melini LLC, Locust Grove, GA (US)

( * ) Notice: Subject to any disclaimer, the term of this patent is extended or adjusted under 35 U.S.C. 154(b) by 414 days.

(21) Appl. No.: 16/050,092

(22) Filed: Jul. 31, 2018

(65) Prior Publication Data
US 2019/0034986 A1 Jan. 31, 2019

Related U.S. Application Data

(60) Provisional application No. 62/539,466, filed on Jul. 31, 2017.

(51) Int. Cl.
*G06Q 30/02* (2012.01)

(52) U.S. Cl.
CPC .............................. *G06Q 30/0282* (2013.01)

(58) Field of Classification Search
CPC ................................................ G06Q 30/0282
See application file for complete search history.

(56) References Cited

U.S. PATENT DOCUMENTS

| 2005/0034071 A1* | 2/2005 | Musgrove | G06F 40/284 715/256 |
| 2009/0133117 A1* | 5/2009 | Bentley | H04L 9/3271 726/17 |
| 2009/0222308 A1* | 9/2009 | Zoldi | G06Q 20/4016 705/38 |
| 2009/0299824 A1* | 12/2009 | Barnes, Jr. | G06Q 30/0207 705/7.39 |
| 2010/0185552 A1* | 7/2010 | DeLuca | G06Q 30/02 705/347 |
| 2012/0017281 A1* | 1/2012 | Banerjee | G06F 21/577 726/25 |

(Continued)

OTHER PUBLICATIONS

D. M. J. Tax and R. P. W. Duin, "Using two-class classifiers for multiclass classification," Object recognition supported by user interaction for service robots, 2002, pp. 124-127 vol. 2, doi: 10.1109/ICPR.2002. 1048253 (Year: 2002).*

*Primary Examiner* — Carrie S Gilkey
(74) *Attorney, Agent, or Firm* — Meunier Carlin & Curfman LLC (57) ABSTRACT

Reviews submitted through a discovery application may be provided to a validation server and reviewed against indicators in the review data to determine whether a given review is potentially fraudulent, not fraudulent or legitimate, or should be flagged for administrative review through an administrative model. Reviews processed by the administrative model may be fed back to a machine leaning module on the validation server as additional positive or negative examples. Using these additional examples, the machine learning module may adjust weights of associated indicators and/or identify additional indicators in the review data for consideration in flagging fraudulent reviews. The additional indicators may be flagged for administrative review prior to implementation in reviewing and flagging reviews.

18 Claims, 7 Drawing Sheets

(56) References Cited

U.S. PATENT DOCUMENTS

| | | | |
|---|---|---|---|
| 2013/0046772 A1* | 2/2013 | Gu | G06Q 30/0282 |
| | | | 707/751 |
| 2013/0246302 A1* | 9/2013 | Black | G06Q 30/0185 |
| | | | 705/347 |
| 2014/0256360 A1* | 9/2014 | Busch | G06Q 30/0261 |
| | | | 455/456.3 |
| 2014/0258169 A1* | 9/2014 | Wong | G06Q 30/0282 |
| | | | 705/347 |
| 2014/0259189 A1* | 9/2014 | Ramachandran | H04W 4/21 |
| | | | 726/30 |
| 2015/0370801 A1* | 12/2015 | Shah | G06Q 30/0282 |
| | | | 707/728 |
| 2016/0078358 A1* | 3/2016 | Baveja | G06N 5/048 |
| | | | 706/52 |
| 2016/0104216 A1* | 4/2016 | Turner | G06Q 30/0282 |
| | | | 705/347 |
| 2017/0103203 A1* | 4/2017 | Sharma | G06F 21/552 |
| 2018/0075496 A1* | 3/2018 | Shah | G06Q 30/0282 |
| 2019/0385071 A1* | 12/2019 | Von Bencke | G06N 7/005 |

\* cited by examiner

THE USER VIEWS A VIDEO REVIEW FROM A NUMBER OF PLACES, INCLUDING A MARKETPLACE AND DISCOVER FEED. THE USER CAN ALSO VIEW VIDEO REVIEWS OF OTHERS THEY FOLLOW IN MELINI

FIG. 5D

A USER CAN CHOOSE TO MAKE A VIDEO REVIEW. THE USER ASSIGNS A NUMERICAL RATING THEN PROCEEDS TO RECORD THE REVIEW

SYSTEM AND METHOD FOR VALIDATING VIDEO REVIEWS

BACKGROUND

Discovery applications provide a way for consumers to explore merchants in their vicinity or in an upcoming travel location, for example. Many such discover applications provide a mechanism for users to review merchants or products through a text-based description of their experience and a rating, such as on a scale from 1-5. Some discovery applications may also allow for an image or set of images to be uploaded along with the review. Frequently, fraudulent reviews may be provided for a given merchant or product from disgruntled customers, competitors, or others. Such fraudulent reviews may not only misinform any users that view the fraudulent review, but also impact aggregated statistics of the merchant, which are primary consumer indicators and potentially impact order of placement of the merchant within the discovery application.

SUMMARY

A method (e.g., server) to estimate likelihood parameter (e.g., a genuine score or fraudulent score) of a review of a company, a product, or a service being fraudulent. The method comprises receiving, by a processor of a first computing device (e.g., a server), from a client application (e.g., mobile app) executing on a plurality of second computing devices (e.g., reviewer mobile device), a plurality of submitted review data (i.e., any and all data associated with a review) associated with a review of a company, a product, or a service having an associated location. Each review data of the plurality of review data comprises one or more of candidate indicators selected from the group consisting of (1) a first identifier of a given second computing device (e.g., network address such as IP address) from which the review data of the company, product, or service is submitted, (2) a second identifier of an associated reviewer account from which the review data is submitted, (3) a third identifier corresponding to a determined frequency at which the given second computing devices is in pre-defined proximity to the associated location, (4) a fourth identifier associated with a determined recency in which the given second computing devices is in pre-defined proximity to the associated location, (5) a fifth parameter associated with a time value (e.g., age, date, etc.) at which the reviewer account is created, (6) a sixth parameter associated with a determined frequency in which the client application is used, and (7) a seventh parameter associated with a determined frequency to which a review is posted. The method comprises receiving, by the processor, from a second application (e.g., Admin Module) executing on a third computing device (e.g., Admin Device) of one or more third computing devices, a plurality of responses associated with the plurality of review data. The method comprises determining, by the processor, via machine learning, a score for each of the plurality of review data based on the received responses and the plurality of review data. A given submitted review data of the plurality of submitted review data is marked for publication (e.g., at a website) when an associated score determined for the given submitted review data is above a pre-defined threshold.

The method further comprises generating, by the processor, a flag indicator of a review data, wherein the generated flag indicator is presented at a graphical user interface associated with the second application (e.g., the Admin module) executing on one of the plurality of third computing devices.

In some aspects, the review data is associated with a video review of the company, product, or service. In some aspects, the plurality of review data further comprises one or more candidate indicators selected from the group consisting of (8) an eighth identifier associated with a determined usefulness of the review compiled from submitted inputs of other users, and (9) a ninth identifier associated with text generated from a machine-based transcription of an audio file or component associated with the submitted review data.

In some aspects, the determined frequency in which the given second computing devices is in pre-defined proximity to the associated location is determined by receiving location coordinates from the second computing devices that were obtained by the client application from a location tracker on the second computing devices, and comparing the location coordinates to locations of the company, the product, or the service to determine if the given second computing devices is within a predetermined distance of one of the locations of the company, the product, or the service for a predetermined length of time, after which the given second computing devices are not determined to be in proximity again until a specified waiting period occurs.

In some aspects, the determined recency in which the given second computing devices is in pre-defined proximity to the associated location is determined by receiving location coordinates from the second computing devices that were obtained by the client application from a location tracker on the second computing devices, and determining how recently the given second computing devices is within a predetermined distance of one of the locations of the company, the product, or the service.

In some aspects, the determined frequency in which the client application is used (e.g., frequency that client application is accessed) is determined by a log of every time a user logs into the client application.

In some aspects, the plurality of review data further comprises one or more candidate indicators selected from the group consisting of (10) an amount of time a user is active in the client application, (11) a number of times a user visits a profile of a company, product, or service, (12) a number of times a user views a commercial of a company, product, or service through the client application, (13) a number of time a user clicks through the client application to a website of a company, product, or service, (14) a number of time a user calls a company, product, or service through the client application, or messages the company, product, or service through the client application, and (15) a level of engagement of the users in navigating reviews.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Video reviews of merchants or products according the present disclosure enable a richer multimedia experience that provides additional information and context to a user's review of a merchant or product. By including video clips as part of the review data, additional information is provided that facilitates validation of whether a given review is fraudulent. Therefore, the video reviews of the present disclosure are provided with an enhanced level of authenticity than reviews provided in prior discovery applications. While the examples provided below are from the perspective of a video review, various aspects of the disclosure may also be used for reviews with only text, text with one or more pictures, only audio, or audio with pictures.

Reviews submitted through the discovery application of the pending disclosure may be provided to a validation server and reviewed against indicators in the review data to determine whether a given review is potentially fraudulent, not fraudulent or legitimate, or should be flagged for administrative review through an administrative model. Reviews processed by the administrative model may be fed back to a machine leaning module as additional positive or negative examples. For example, positive examples may include flagged reviews that an administrator has determined are legitimate, while negative examples may include flagged reviews that an administrator has determined are fraudulent. Using these additional examples, the machine learning module may adjust weights of associated indicators and/or identify additional indicators in the review data for consideration in flagging fraudulent reviews. Additional indicators identified by the machine learning module may be flagged for administrative review prior to implementation in reviewing and flagging reviews. By coupling machine learning with location-based assurance, the machine learning module automatically learns to flag potentially fraudulent reviews for administrative action. Administrative action on potentially fraudulent reviews may include taking down the potentially fraudulent review, restricting access to a user who posted the potentially fraudulent review, and restricting access to a merchant or product with whom the user is associated with. Other administrative actions may be taken.

In some implementations, false positive examples and false negative examples may also be fed back to the machine learning module. False positive examples may be identified by audits of flagged potentially fraudulent reviews where an administrator decides that the review is actually a legitimate review. False negative reviews may be reviews that the machine learning module flagged as a legitimate review, but for which a merchant has filed a complaint or a take-down request is received. Upon an administrator determining that the review is fraudulent, the administrative module may supply the false negative review back to the machine learning module.

Review data associated with a given review may include an IP address of the user, an identifier associated with an account of the user, location history data of the user including location frequency and location recency data, age of the associated account, frequency at which the account is used, frequency of reviews posed by the account. Additional review data may be generated by the validation server. For example, subtitles may be extracted or the audio streams in a review may be analyzed to generate subtitles for review by the machine learning module.

Figure 1:
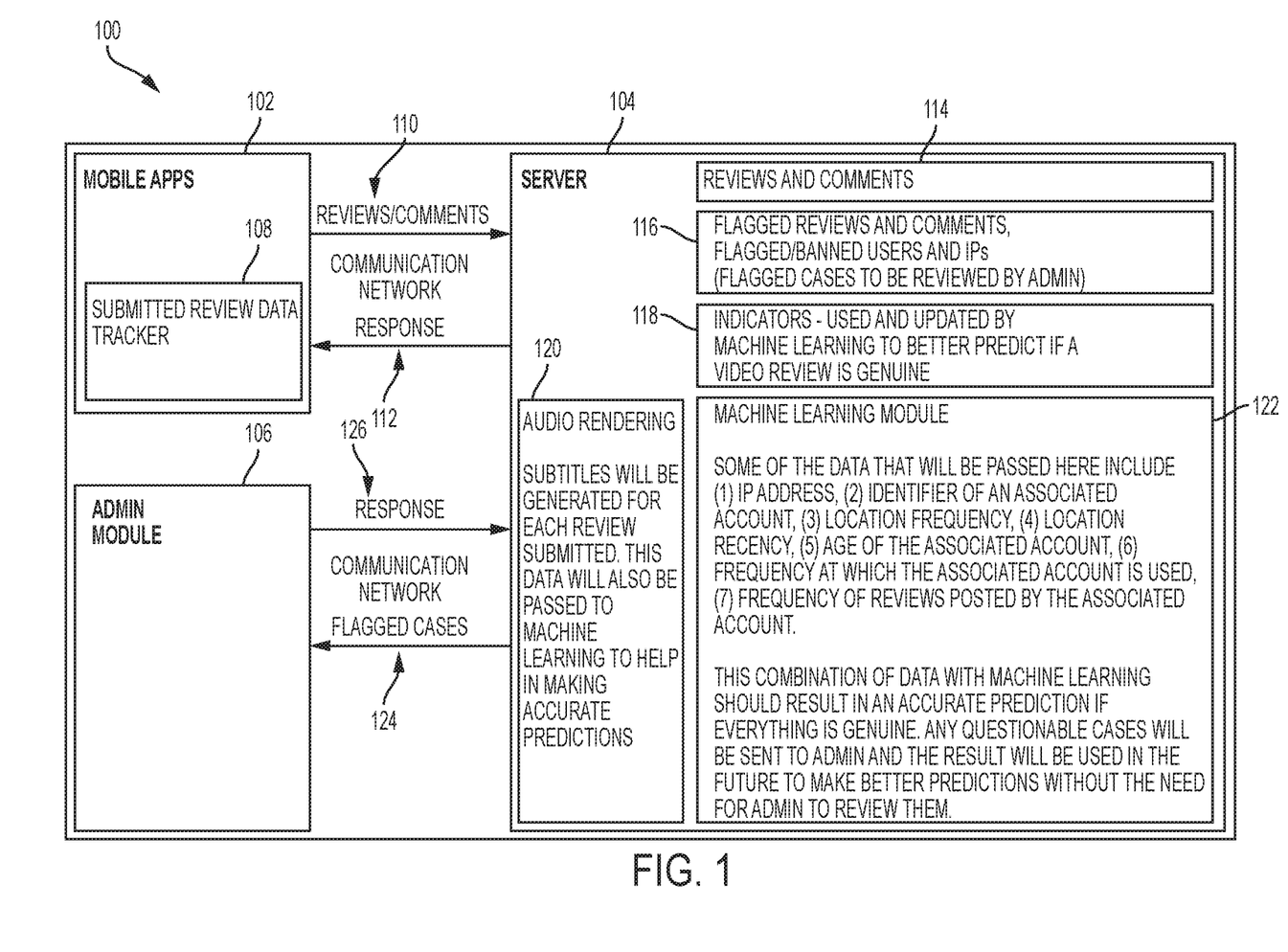
FIG. 1 illustrates an exemplary review validation system suitable for implementing several embodiments of the disclosure.

FIG. 1 illustrates an exemplary review validation system 100 suitable for implementing several embodiments of the disclosure. The validation system includes a mobile application 102 that may be running on a client device (not shown), such as a mobile phone, tablet computer, laptop, or other such computing device. The mobile application 102 may be configured to communicate with a server 104 for posting a validating reviews of a merchant, product, or service. The server 104 may in turn be in communication with an administrative module 106, described in more detail below with reference to FIG. 4.

The server 104 may receive reviews of merchants, products, or services from the mobile application 102 via a communication 110. The server 104 may process the review to publish the review on the server such that it is accessible to other users, such as via a review database 114. The server may process the reviews by providing review data and user account data to a machine learning module 122. The machine learning module 122 may process the review data based on a plurality of indicators 118 of fraudulent reviews. Each of the indicators 118 may be assigned to a different weight, which may be adjusted by the machine learning module 122 as additional positive and negative examples of fraudulent reviews are provided. The server 104 may flag reviews in a flagged database 116 with an authenticity score below a first threshold for administrative review via the administrative module 106. Such flagged cases 124 may be sent to the administrative module 106 for review. Based on the review, each of the flagged cases 124 is returned to the server 104 in a response 126 with an indication of whether the review is determined to be fraudulent. The response 126 along with the indication of whether a given review is determined to be fraudulent is provided to the machine learning module 122 as additional learning examples.

The server 104 may also flag reviews in the flagged database 116 with an authenticity score below a second threshold as fraudulent and perform one or more administrative actions in response to the review being flagged as fraudulent. Administrative actions on potentially fraudulent reviews may include taking down the potentially fraudulent review, restricting access to a user who posted the potentially fraudulent review, and restricting access to a merchant or product with whom the user is associated with. Other administrative actions may be taken.

The review may be processed on the server 104 by an audio rendering module to generate a transcript of the review. The transcript of the review may be supplied to the machine learning module 122 as review data. Review data associated with a given review may include subtitles generated from audio streams in the review, text entered as part of the review, graphics added to the review through the mobile application, the IP address from which the review is submitted, an identifier of an account through which the review is submitted, a location frequency associated with client device and a location of the merchant, product, or service being reviewed, how recently the client device with the mobile application 102 has been at a location of the merchant, product, or service being reviewed, the age of the account, the frequency at which the account is used, and the frequency of reviews posted by the account. Other review data may be used. A plurality of the review data may be used as an indicator of whether a given review is likely fraudulent.

Figure 2:
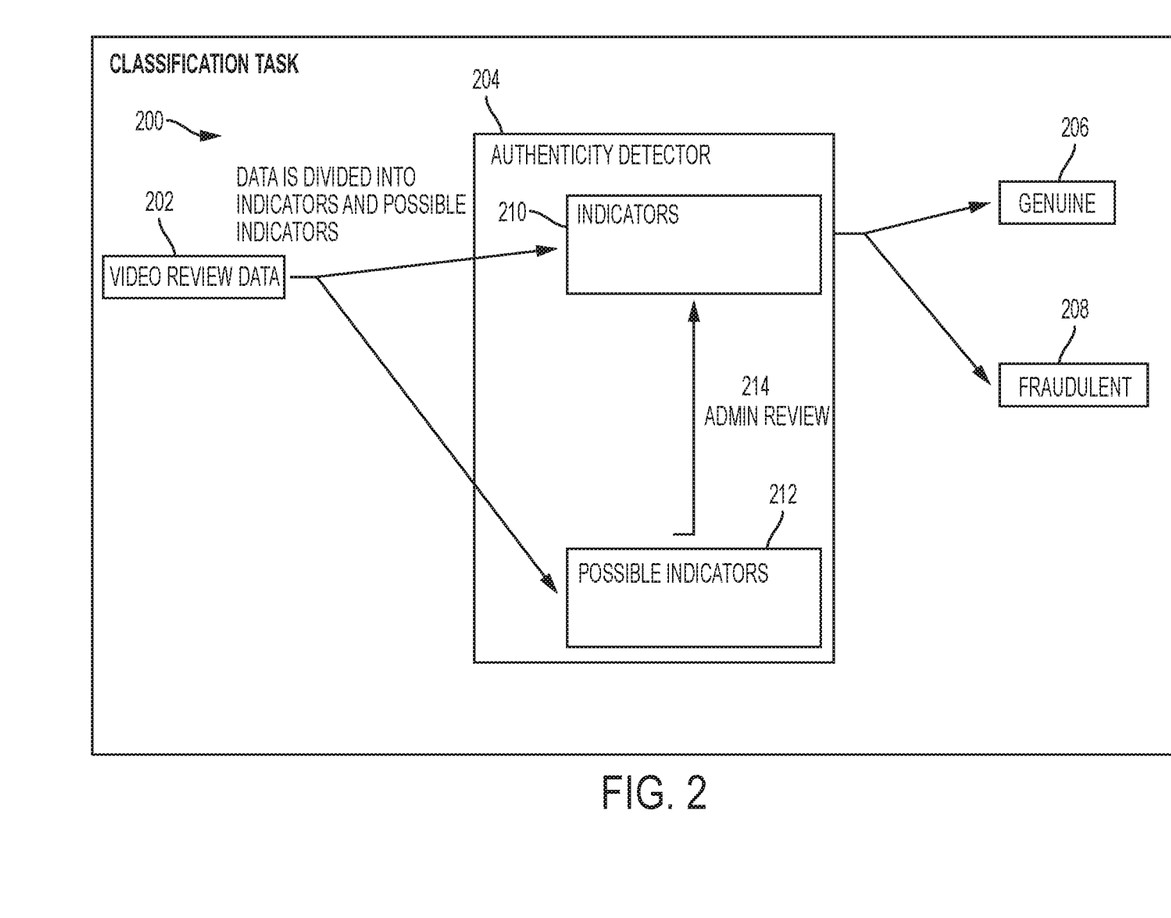
FIG. 2 illustrates an exemplary classification task flow diagram suitable for implementation by the machine learning module of FIG. 1 according to several embodiments of the disclosure.

FIG. 2 illustrates an exemplary classification task flow diagram suitable for implementation by the machine learning module 122 of FIG. 1 according to several embodiments of the disclosure. The machine learning module 122 may receive review data 202 and process the review data through an authenticity detector 204. The authenticity detector 204 may use the indicators 210 to determine an authenticity score for a given review. Based on the authenticity score, the authenticity detector may determine that a review is genuine 206 or fraudulent 208. For reviews determined to be fraudulent 208, based on the authenticity score a subset may be supplied to the authentication module 106 for further review. Others may be summarily flagged as fraudulent. The authenticity detector 204 may also receive additional training inputs over time based on the reviews from the administrative module 106. Based on the additional training inputs, the authenticity detector 204 may generate additional possible indicators 212. The authenticity detector 204 may supply the additional possible indicators 212 to the administrative module 106 for review. Indicators returned from the administrative module 106 as likely indicators of fraudulent review may be added to the indicators 210 for future reviews.

Figure 3:
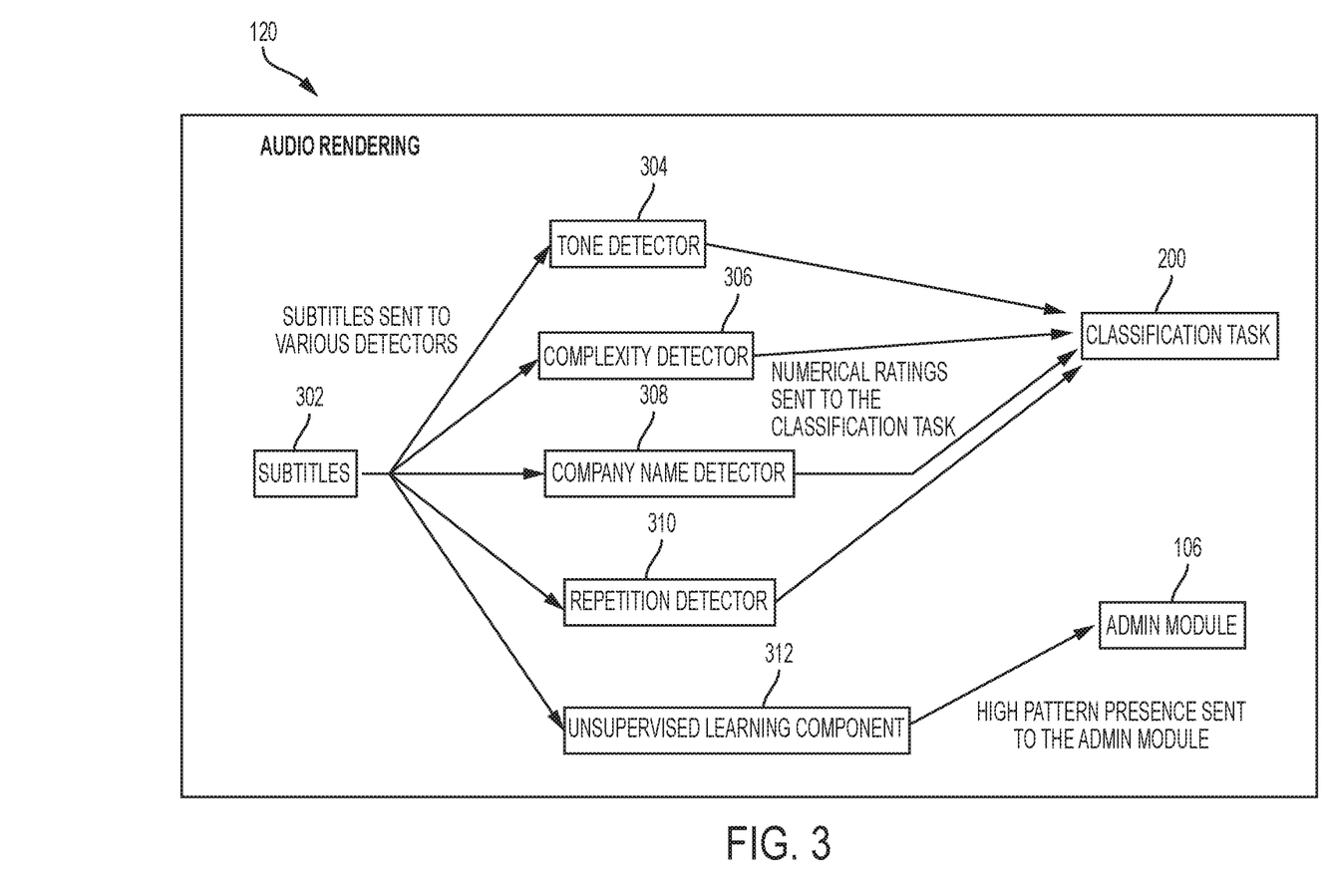
FIG. 3 illustrates an exemplary audio rendering module suitable for implementing several embodiments of the disclosure.

FIG. 3 illustrates an exemplary audio rendering module 120 suitable for implementing several embodiments of the disclosure. The audio rendering module 120 may process transcripts of the review to detect audio characteristics such as through a tone detector 304, a complexity detector 306, a name detector 308, and a repetition detector 310 which may all be fed into the classification task as additional review data 202. Additionally, the audio rendering module 120 may have an unsupervised learning component 312 that may learn additional audio characteristics that are indicative of fraudulent reviews that may be reviewed by the administrative module 106 for inclusion in processing future reviews.

Figure 4:
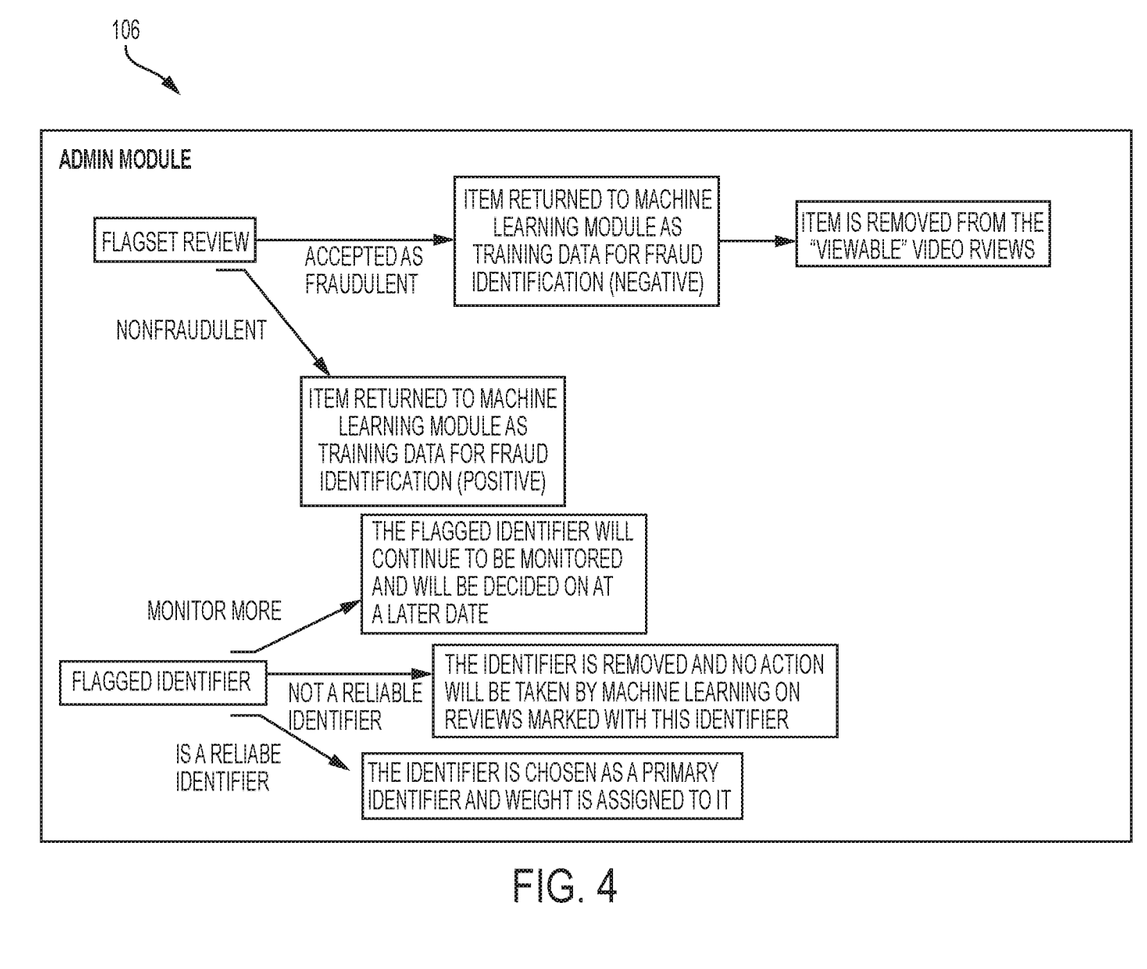
FIG. 4 illustrates an exemplary flagset review flow diagram and an exemplary flagged identifier suitable for implementation by the admin module of FIG. 1 according to several embodiments of the disclosure.

FIG. 4 illustrates an exemplary flagset review flow diagram and an exemplary flagged identifier suitable for implementation by the admin module of FIG. 1 according to several embodiments of the disclosure. As discussed above, the administrative module 106 may have flows for two tasks. A first being to review flagged potentially fraudulent reviews. The administrative review results in the reviews either being accepted as fraudulent or determined to be non-fraudulent. Either way, the result of the administrative review is fed back to the machine leaning module 122 as additional training examples. Additionally, the reviews accepted as fraudulent are removed from the review database 114 so that users may no longer see those reviews.

A second task performed by the administrative module 106 is to review flagged additional possible indicators 212 supplied from the authenticity detector 204. Upon review, an additional possible indicator may be flagged for additional monitoring, determined to not be a reliable indicator, or determined to be a reliable indicator for predicting fraudulent reviews. If the possible indicator is flagged for additional monitoring, additional examples with the possible indicator will be gathered for making a later determination of whether the possible indicator is a reliable indicator for predicting fraudulent reviews. If the possible indicator is determined not to be a reliable indicator for predicting fraudulent reviews, the possible indicator is removed and no action will be take by the machine learning module 122 on reviews marked with this indicator. If the possible indicator is determined to be a reliable indicator for predicting fraudulent reviews, the possible indicator is selected as a primary indicator and a weight is assigned to the new indicator by the machine learning module 122 for classifying reviews.

Figure 5A:
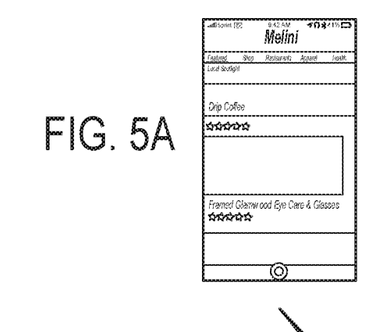
FIG. 5A-5E illustrates exemplary screenshots of the mobile application of FIG. 1 according to several embodiments of the disclosure.
Figure 5B:
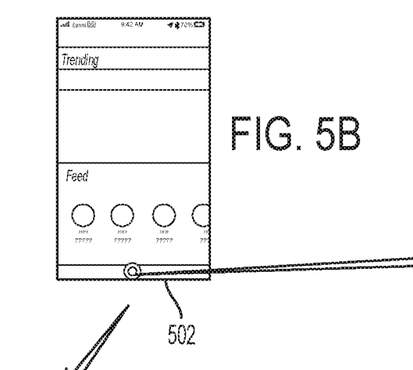
Figure 5C:
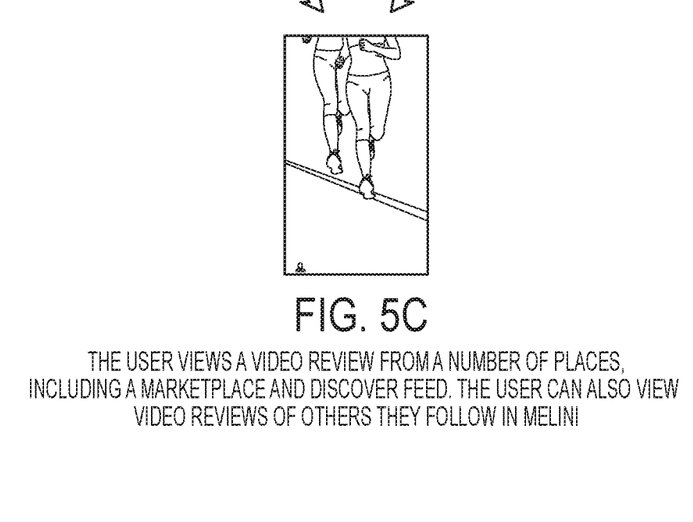
Figure 5D:
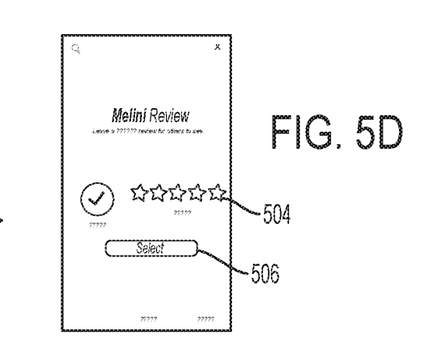
Figure 5E:
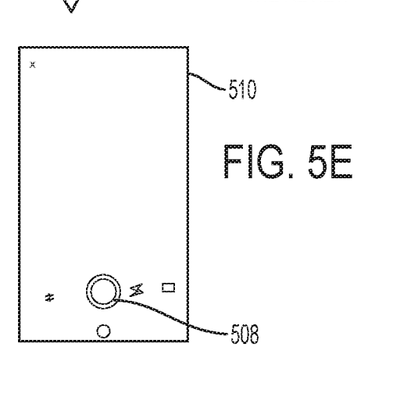

FIGS. 5A-5E illustrates exemplary screenshots of the mobile application of FIG. 1 according to several embodiments of the disclosure. FIGS. 5A and 5B provide a marketplace and discovery feed from which a user may explore reviews on the mobile application 102. The videos in either section may be from merchants, service provides, or products as commercials or video reviews of users. Upon a user selecting a desired video, a playback of the video may commence, such as shown in FIG. 5C. If a user selects a review icon 502, the user may generate a review for the corresponding merchant, service provider, or product. The review screen shown in FIG. 5D may provide a selectable input 504 to rate the merchant, service provider, or product. Upon a user being satisfied with their rating, they may select an input 506 to commence recording a video review of the merchant, service provider, or product, such as shown in FIG. 5E. Upon completing their video review, the user may select the icon 508 to stop the video review.

The initial weights of for the indicators will likely be determined by a period of supervised learning using some initial training data likely with multivariate linear regression and continued as further data is added to the datastore from the mobile apps. Unsupervised learning will be used with the "rest" of the data, that is, data not initially identified as an indicator to help spot patterns and identify future indicators.

A classification system is used for determining whether the video review is genuine that includes applying the received review information in a form of data to be utilized by the plurality of machine learning algorithms, determining whether the transaction is a fraudulent review by a competitor, bot, or other non-genuine reviewer, and if the probabilities meet a minimum point of departure for a decision in a tree for a fraudulent review but does not exceed the maximum point of departure that results in the immediate removal of the review from the visible presentation on the mobile apps, the classification task flags the video review for review by the Admin Module, or if the immediate removal departure, the review is removed from the datastore and the mobile apps no longer display the fraudulent review. All decisions are returned to the classification task for adjustments.

Additional indicators may be explained through a first scenario. A company creates a profile on the mobile application 102 for their company. From the same general location a person creates a personal profile and then creates a review. From time to creation of company to creation of review is very short, so that already throws an indicator. One additional indicator is if the person's face in the video review "recognizes" the face of the profile photo for the company's owner. In this scenario a face detection algorithm is used first to detect the face, then a facial recognition algorithm is used to see whether such face is recognized as the same face as in the company owner's profile photo. If it recognizes the face, then it becomes a potentially strong indicator that the review is fraudulent.

Further indicators may be explained through a second similar scenario. If the same "face" appears in a number of different reviews for the same company, probabilities indicate that such review is suspicious. The owner could be creating or using a bot to create a number of different "users" and then providing reviews themselves.

A further indicator may include the presence of a "face" in the video review is an indicator that it is more trustworthy perhaps than a video that shows a plate of food.

Additional indicators include an examination of the audio file, to see if has a "signature" that is unique and that can be compared to other "signatures" to: 1) see if that signature appears multiple times for a business, and 2) see if that audio signature is appearing so often it could be a "bot."

Additional indicators include how long a video review is and the relative length of a transcript of the audio and the length of the video. For example, a video could be 9 seconds for example, and only have 5 words.

Additional indicators may be based on supplemental content that a user can provided "on top of" the review that are then included in the final render:

1. Does the person add "art" to the video review from an art picker. The art picker includes different "stickers" like a "heart", "ballons", etc.
2. If the person adds art, which art is chosen.
3. How many art stickers are added.
4. If a person adds written text to the review, what does the text say?
5. Is the text big or small.
6. Does the person draw on the screen?
7. If they draw on the screen, which color do they choose?

One way to think about the unsupervised learning is that it is a way in which the machine learning module 122 is optimized, improved, or otherwise has a reduced error for detecting fraudulent reviews. In some implementations, the unsupervised learning may be compared to anomaly detection. The machine learning module 122 looks for points of inconsistency with prior data, (e.g. a really long video review, one that runs like 5 minutes instead of the average of 10 seconds). When a point of inconsistency is detected, the machine learning module 122 determines whether the inconsistent data point is a first instance, (e.g. the first time such an inconsistent data point was detected). If the inconsistent data point is a first instance, then the machine learning module 122 marks the inconsistent data point as an anomaly and continues to watch for additional instances of the inconsistent data point. If the inconsistent data point is already being watched by the machine learning module 122, then the machine learning module 122 increments a count for a number of instances of detecting the inconsistent data point.

Once a threshold number of instances of detecting the inconsistent data point has been reached, the machine learning module 122 performs an analysis comparing the inconsistent data point with classifications of reviews. If the comparison indicates there is a relevant probabilistic chance of providing a relevant label for the supervised learning performed by the machine learning module 122, then the machine learning module 122 generates an alert (e.g., additional possible indicators 212) to the administrative module 106 for an administrator to review. As discussed above in conjunction with FIG. 4, the administrator will review and decide if the possible indicator needs to continue to be watched for additional instances, cleared from watching for such anomalies altogether, or used to modify the supervised machine learning module 106 to additionally include the possible indicator. For example, for video reviews, such unsupervised learning has shown that not just length of video is a relevant label to watch, but long length is particularly helpful in determining review veracity (e.g., whether or not a review is fraudulent).

In addition to the above anomaly detect, the machine learning module 122 also performs cluster analysis on the received data. The machine learning module 122 looks for small clusters of fields in review data and user account data supplied to the machine learning module 122 that are not actively monitored as one of the plurality of indicators 118 of fraudulent reviews. Small clusters of fields include clusters with a number of fields below a threshold number of fields that are determined to have a relevant probabilistic chance of providing a relevant label for the supervised learning performed by the machine learning module 122. The small clusters of fields is in contrast to larger clusters of fields an is intended to identify missed or smaller but potentially relevant clusters of fields that are predictive of a given label for the machine learning module 122 (e.g., fraudulent review). In some implementations, the threshold number of fields may be modified by the machine learning module 122 during the cluster analysis.

In various implementations of the machine learning module 122, the machine learning module may be a multi-class classifier as opposed to just a binary classifier (e.g., fraudulent or not fraudulent). In some implementations, the multi-class classifier of the machine learning module may classify a review as one of 5 possible classifications. For ease of explanation, the classifications may be labeled as "0", "1", "2", "3", or "4". The "0" label may correspond to a classification of a review as fraudulent. The "1" label may correspond to a classification of a review as suspicious or irrelevant. The "2" label may correspond to a classification of a review as average. The "3" label may correspond to a classification of a review as useful. The "4" label may correspond to a classification of a review as very useful.

Actions may be taken on the reviews based on the classification assigned. For example, a display order of reviews may be prioritized based upon the labels assigned to the reviews. Some reviews, such as those with a "1" label may have additional data collected for use in reclassifying the review at a later time. For example, the additional collected on suspicious reviews may include how many times a review is viewed, whether it is liked by trustworthy users, or other additional data that is useful for reclassifying a review. Other actions include blocking fraudulent reviews from display after they are recorded, or blocking fraudulent reviews from being recorded in the first place.

Utilizing the multi-class approach also helps in adjusting for data-set imbalances (e.g., having more available data examples for some classes over others). The multi-class approach may serve to spread the data out to have a lower differential in the amount of data available among the different classes than would be present with a binary classifier. For example, the data distribution of reviews for each class may be as follows: 5% fraudulent, 15% suspicious, 60% average, 10% useful, and 10% very useful. However, a binary classifier using the same data may result in a data distribution of 5% fraudulent and 95% not fraudulent. However, as shown above, even with a multi-class approach, some large data imbalances may still be present.

An approach for adapting to the data imbalances among the classes is to use a one-vs-rest strategy. Following the multi-class data distribution in the above example, while training a model for the fraudulent class, the complete data set of fraudulent training data (e.g., 5% of the total training data set) is used as positive examples of the class and the same amount (e.g., 5% of the total training data set) of randomly selected data from the remaining training data (e.g., 95% of the total training data set) is used as negative examples of the class. Likewise, while training a model for the suspicious class, the complete data set of suspicious training data (e.g., 15% of the total training data set) is used as positive examples of the class and the same amount (e.g., 15% of the total training data set) of randomly select data from the remaining training data (e.g., 85% of the total training data set). The useful and very useful classes may similarly use the above strategy for providing balanced sets of positive and negative examples of training data for the class. In general, for classes where there is more training data for negative examples of a class than for positive examples of the class, then randomly selected data of the negative examples in an amount equal to the amount of training data available for the positive examples is used to train the class and have a balanced amount of positive and negative training examples.

In the data distribution in the example provided above, the average class has more than 50% of the total amount of training data. Therefore, rather than reducing the amount of negative examples used to train the class, the amount of positive examples may be reduced. For example, while training a model for the average class, the complete data set of training data not labeled as average (e.g., 40% of the total training data set) is used as negative examples of the class and the same amount (e.g., 40% of the total training data set) of randomly selected data from the average set of training data (e.g., 60% of the total training data set) is used as positive examples of the class. In general, for classes where there is more training data for positive examples of a class than for negative examples of the class, then randomly selected data of the positive examples in an amount equal to the amount of training data available for the negative examples is used to train the class and have a balanced amount of positive and negative training examples.

Instances where reviews are blocked from being completed because they are determined to be fraudulent provide an opportunity for additional training examples, but result in missing data. For example, for video reviews, if a review is blocked before the video is recorded, then the missing data may include the visual and audio content of the review that was blocked. Such visual and audio content may include the face of the review, the voice of the review, the words the reviewer says, or the subject of the review (e.g., the review themselves, a food, a product, a service, etc.). However, there is still useful data available for providing additional positive examples of a class. For example, with the blocked video review, it is already known that a particular user is making an attempt at a fraudulent review, all their data history with the mobile application 102 and server 104, their current location, their IP address, their usefulness to other users, reviews the user has viewed of other users, companies the user has explored using the mobile application 102 and server 104, etc. However, it is difficult to include additional training examples for a class using data sets with missing data without negatively impacting the machine learning module 122.

Some approaches for accounting for the missing data in the blocked reviews include to just drop the data points with missing values or fill in missing values with the median (for numerical values) or mode (for categorical values). Another approach for accounting for the missing data in the blocked reviews would be a one-step pre-computation method which normalizes features to construct a distance metric for filling in missing values with the median of their k-nearest neighbors.

However, it was determined that in different situations, different approaches for accounting for the missing values in the blocked reviews worked better than others. For example, in some situations, data classified better when the blocked data just dropped the missing data points, and in some situations, data classified better when the blocked data was filled in with different values.

Therefore, a secondary classifier is used in addition to the machine learning module 122. The secondary classifier performs a mapping using a multi-class support vector machine with three classifications, where a mapping function is learned to decide which approach to use for addressing the missing data in a blocked review: a) exclude the missing data; b) fill in missing values with the median/mode of the fields with missing data; or c) fill in missing values with the median/mode of the k-nearest neighbors. In some implementations, a random forest classifier may be used.

In some implementations, rather than blocking reviews from being completed for reviews that are determined to be fraudulent, the user is allowed to complete their review and the additional data supplied by the completed review is used to populate a complete example of a fraudulent review without any missing data.

Figure 6A:
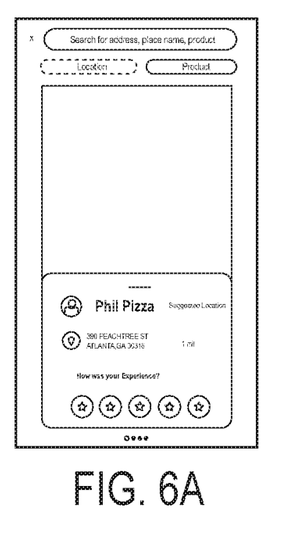
FIGS. 6A-6D illustrate exemplary screenshots of user verification prior to allowing creation of a video review in the mobile application of FIG. 1 according to several embodiments of the disclosure.
Figure 6B:
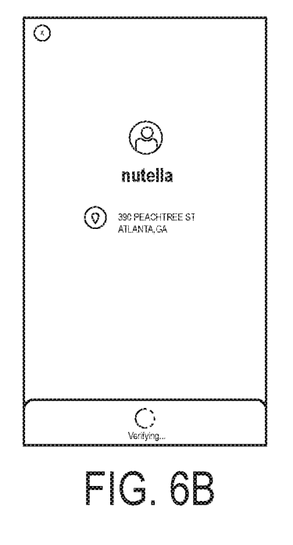
Figure 6C:
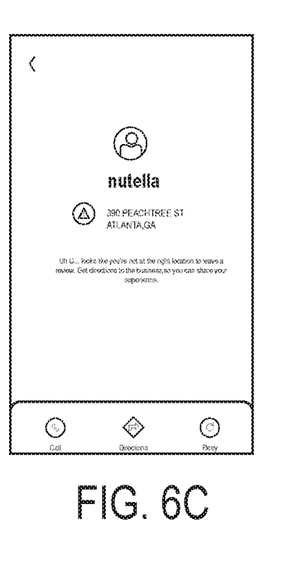
Figure 6D:
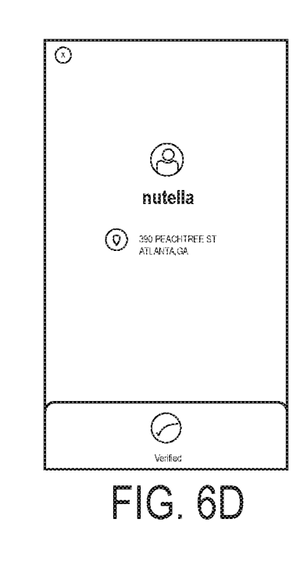

FIGS. 6A-6D illustrate exemplary screenshots of user verification prior to allowing creation of a video review in the mobile application of FIG. 1 according to several embodiments of the disclosure. FIG. 6A illustrates a screenshot of a user review screen on the mobile application 102. Similar to FIG. 5D above, the user review screen may provide a selectable input to rate the merchant, service provider, or product. Upon the user being satisfied with their rating, they may select an input to commence recording a video review of the merchant, service provider, or product. However, as shown in FIG. 6B, prior to allowing the user to record a video review, a user verification process is executed by the server 104 to verify whether the review is authentic. If the review is determined to not be authentic, such as based on the user not being at a location of the merchant, service provider, or product they want to review, an error screen is shown in FIG. 6C. In some implementations, the error screen of FIG. 6C may additionally provide a selectable option for obtaining directions to a location of the merchant, service provider, or product they want to review. Otherwise, if the review is determined to be authentic, a verification screen is shown in FIG. 6D prior to navigating the user to a video review screen, such as shown in FIG. 5E and described above.

The user verification may be executed on the server 104 and includes a trusted authentication check, a multiple review check, a location check, and an owner check. The trusted authentication check includes determining a variety of parameters for the user. The parameters include a FRT (Fake Reviews Threshold) that is a number of reviews that were not authenticated at time of writing the current review. The parameters also include a PRAC (Previous Review Attempt of Company) that is a check to determine if the user has tried to make an un-authenticated review of a subject of their review (e.g., a business). The parameters also include ISHCR (If User Has Complaints recorded) that is a determination of whether the user has complaints recorded against them, either by other users or an admin group. An authentication process is run on the server 104 using the determined parameters to flag the user either as trusted (and therefore allowed to create a review of the subject of their review) or untrusted (and therefore block the user from completing their review of the subject).

The multiple review check determines whether the user is leaving more than one review at a location within a threshold period of time. If the user is making more than one review within the threshold period of time, then the user is blocked from completing their review. In some implementations, the user may further be blocked from making any additional reviews of the subject.

The location check determines whether the user is at a location for the subject of their review or has visited the location within a threshold period of time. If not, then the user is blocked from completing the review.

The owner check determines whether the user is an owner of the subject of the review (e.g., the business owner of a particular business). If the user is an owner of the subject of the review, then the user is blocked from completing the review.

If all of the trusted authentication check, multiple review check, location check, and owner check are completed without blocking the user from completing the review, then the user is allowed to complete their review, such as by recording a video review of the subject of their review.

It should be appreciated that the logical operations described herein with respect to the various figures may be implemented (1) as a sequence of computer implemented acts or program modules (i.e., software) running on a computing device (e.g., the computing device described in FIG. 7), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 7:
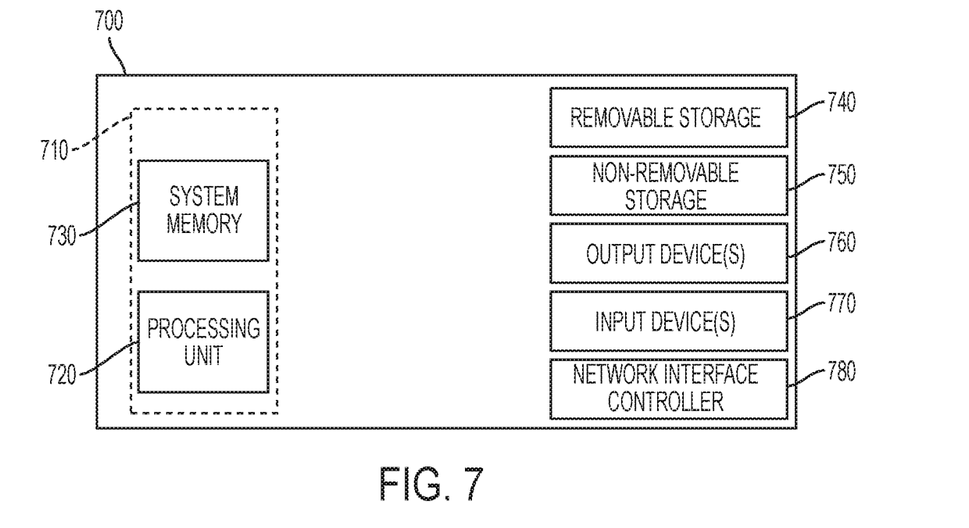
FIG. 7 illustrates an exemplary computer system suitable for implementing the several embodiments of the disclosure.

Referring to FIG. 7, an example computing device 700 upon which embodiments of the invention may be implemented is illustrated. For example, each of the client device running the mobile application 102, the server 104, and the administrative module 106 described herein may each be implemented as a computing device, such as computing device 700. It should be understood that the example computing device 700 is only one example of a suitable computing environment upon which embodiments of the invention may be implemented. Optionally, the computing device 700 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 700 to provide the functionality of a number of servers that is not directly bound to the number of computers in the computing device 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 700 typically includes at least one processing unit 720 and system memory 730. Depending on the exact configuration and type of computing device, system memory 730 may be volatile (such as random-access memory (RAM)), non-volatile (such as read-only memory (ROM), flash memory, etc.), or some combination of the two. This most basic configuration is illustrated in FIG. 7 by dashed line 710. The processing unit 720 may be a standard programmable processor that performs arithmetic and logic operations necessary for operation of the computing device 700. While only one processing unit 720 is shown, multiple processors may be present. Thus, while instructions may be discussed as executed by a processor, the instructions may be executed simultaneously, serially, or otherwise executed by one or multiple processors. The computing device 700 may also include a bus or other communication mechanism for communicating information among various components of the computing device 700.

Computing device 700 may have additional features/functionality. For example, computing device 700 may include additional storage such as removable storage 740 and non-removable storage 750 including, but not limited to, magnetic or optical disks or tapes. Computing device 700 may also contain network connection(s) 780 that allow the device to communicate with other devices such as over the communication pathways described herein. The network connection(s) 780 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 700 may also have input device(s) 770 such as a keyboards, keypads, switches, dials, mice, track balls, touch screens, voice recognizers, card readers, paper tape readers, or other well-known input devices. Output device(s) 760 such as a printers, video monitors, liquid crystal displays (LCDs), touch screen displays, displays, speakers, etc. may also be included. The additional devices may be connected to the bus in order to facilitate communication of data among the components of the computing device 700. All these devices are well known in the art and need not be discussed at length here.

The processing unit 720 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 720 for execution. Example tangible, computer-readable media may include, but is not limited to, volatile media, non-volatile media, removable media and non-removable media implemented in any method or technology for storage of information such as computer readable instructions, data structures, program modules or other data. System memory 730, removable storage 740, and non-removable storage 750 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 720 may execute program code stored in the system memory 730. For example, the bus may carry data to the system memory 730, from which the processing unit 720 receives and executes instructions. The data received by the system memory 730 may optionally be stored on the removable storage 740 or the non-removable storage 750 before or after execution by the processing unit 720.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method to estimate a likelihood parameter of a review of a company, a product, or a service being fraudulent, the method comprising:
    receiving, by a processor of a validation serve, from a client application executing on a plurality of client devices, a plurality of submitted reviews of a company, a product, or a service having an associated location, each of the reviews comprising a plurality of review data;
    determining an authenticity score for each of the reviews, by the processor via a machine learning model with inputs of a plurality of indicators in the review data of each of the plurality of reviews and at least one output, wherein one or more of the plurality of indicators are selected from the group consisting of: a determined frequency at which a given client device from which a given review of the plurality of reviews is submitted is in pre-defined proximity to the associated location, a determined recency in which the given client device is in the pre-defined proximity to the associated location, a time value at which a reviewer account from which a given review is submitted is created, a determined frequency in which the client application is used, and a determined frequency to which a review is posted;
    flagging, by the processor, reviews with an authenticity score below a first threshold for administrative review by a second application executing on an administrative computer of one or more administrative computers;
    receiving, by the processor, from the second application executing on the administrative computer, a plurality of responses, each of the responses comprises an indication of whether an associated one of the reviews flagged for administrative review is determined to be fraudulent;
    training, by the processor, the machine learning model by adjusting weights associated with the plurality of indicators based on the plurality of responses;
    wherein a given submitted review of the plurality of submitted reviews is marked for publication when an associated authenticity score determined for the given submitted review is above a pre-defined threshold;
    generating and supplying to the second application executing on the administrative computer, by the processor, an additional possible indicator of a fraudulent review from the plurality of responses;
    receiving, by the processor, from the second application executing on the administrative computer a determination that the additional possible indicator is determined to be a reliable indicator for predicting fraudulent reviews; and
    adding, by the processor, the reliable indicator to the machine learning model for classifying reviews.

2. The method of claim 1, further comprising:
    generating, by the processor, a flag indicator of a review data, wherein the generated flag indicator is presented at a graphical user interface associated with the second application executing on one of the administrative computers.

3. The method of claim 1, wherein the review data is associated with a video review of the company, product, or service.

4. The method of claim 1, wherein one or more of the plurality of indicators is selected from the group consisting of: a determined usefulness of the review compiled from submitted inputs of other users, and text generated from a machine-based transcription of an audio file or component associated with the submitted review data.

5. The method of claim 1, wherein the determined frequency in which the given client device is in pre-defined proximity to the associated location is determined by receiving location coordinates from a location tracker on the given client device, and comparing the location coordinates to locations of the company, the product, or the service to determine if the given client device is within a predetermined distance of one of the locations of the company, the product, or the service for a predetermined length of time, after which the given client device is not determined to be in proximity again until a specified waiting period occurs.

6. The method of claim 1, wherein the determined recency in which the given client device is in pre-defined proximity to the associated location is determined by receiving location coordinates from a location tracker on the given client device, and determining how recently the given client device is within a predetermined distance of one of the locations of the company, the product, or the service.

7. The method of claim 1, wherein the determined frequency in which the client application is used is determined by a log of every time a user logs into the client application.

8. The method of claim 1, wherein one or more of the plurality of indicators is selected from the group consisting of: an amount of time a user is active in the client application, a number of times a user visits a profile of a company, product, or service, a number of times a user views a commercial of a company, product, or service through the client application, a number of time a user clicks through the client application to a website of a company, product, or service, a number of time a user calls a company, product, or service through the client application, or messages the company, product, or service through the client application, and a level of engagement of the users in navigating reviews.

9. The method of claim 1, further comprising:
flagging, by the processor, reviews with an authenticity score below a second threshold as fraudulent.

10. The method of claim 1, wherein the responses comprise false positive training examples where a review flagged for administrative review is determined to be legitimate.

11. The method of claim 1, further comprising:
receiving a false negative review, by the processor, from the second application executing on the administrative computer, wherein the false negative review is a review marked for publication based upon an associated authenticity score above the pre-defined threshold but for which a complaint or take-down request has been received; and
training, by the processor, the machine learning model by adjusting weights associated with the plurality of indicators based on the false negative review.

12. The method of claim 1, wherein generating the additional possible indicator comprises identifying, by the processor, instances of a review data that is inconsistent with prior review data more than a threshold number of times; and
determining, by the processor, whether the review data that is inconsistent with prior review data has a probabilistic chance of predicting fraudulent reviews; and
generating, by the processor, an alert to the second application executing on the administrative computer with the inconsistent review data.

13. The method of claim 1, wherein generating the additional possible indicator comprises performing, by the processor, cluster analysis on the review data to identify a cluster of review data with a number of fields below a threshold that are determined to have a probabilistic chance of predicting fraudulent reviews; and
generating, by the processor, an alert to the second application executing on the administrative computer with the cluster of review data.

14. The method of claim 1, wherein adding the reliable indicator to the machine learning model comprises assigning a weight to the reliable indicator.

15. The method of claim 1, wherein the machine learning model is a multi-class classifier, wherein one of the classifications of the multi-class classifier is a classification of a review as fraudulent.

16. The method of claim 15, wherein each class is trained with training data using a one-vs-rest strategy.

17. The method of claim 16, wherein with the once-vs-rest strategy, the classification of a review as fraudulent is trained with a first amount of positive examples of fraudulent reviews from the training data and with the first amount of negative examples of randomly selected data from the training data.

18. The method of claim 1, wherein the plurality of indicators in the review data are a subset of the review data.

* * * * *